UNITED STATES PATENT OFFICE.

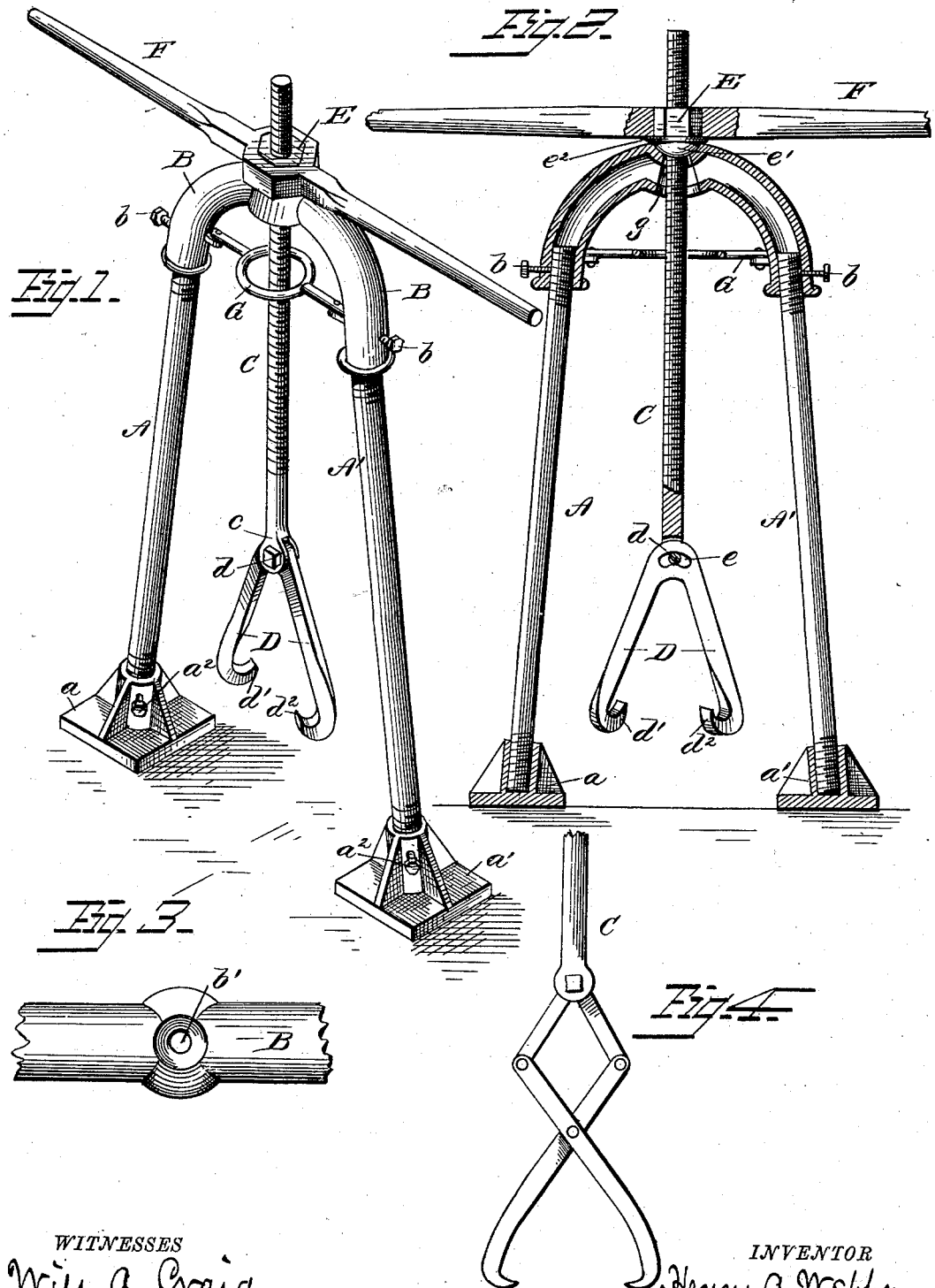

HENRY A. WEBBER, OF ROCKTON, ILLINOIS.

LIFTING-JACK.

SPECIFICATION forming part of Letters Patent No. 268,328, dated November 28, 1882.

Application filed November 6, 1882. (No model.)

*To all whom it may concern:*

Be it known that I, HENRY A. WEBBER, a citizen of the United States of America, residing at Rockton, in the county of Winnebago and State of Illinois, have invented certain new and useful Improvements in Lifting-Jacks or Grapples, of which the following is a specification, reference being had therein to the accompanying drawings.

My invention has relation to grapples or devices for grasping and raising heavy weights; and the object of the invention is to provide a device of this class that shall be simple and effective in operation, cheap in construction, portable, and operated with facility by one person.

To that end the novelty consists in the construction of the same, as will be hereinafter more fully described, and particularly pointed out in the claims.

In the accompanying drawings similar letters of reference indicate like parts of the invention.

Figure 1 is a perspective view of the grapple; Fig. 2, a vertical section of the same; Fig. 3, a top plan of the central portion of the yoke, and Fig. 4 a modification of the grappling-hooks.

A A' are the standards, made of wrought-iron pipe or tubing, and screwed into the feet $a$ $a'$, and secured in place by the set-screws $a^2$. By this means the standards can be lengthened or shortened by screwing them in or out of the feet, so as to adjust them for inequalities of the ground. The upper ends of the standards are screwed into the adjustable yoke B, and are likewise adjustably secured in place by the set-screws $b$, and by screwing the standards in the yoke for a greater or less distance the same adjustment is obtained as in the feet.

Through the center of the yoke B passes a screw-bar, C, the lower end of which terminates in a head, $c$, to which is secured the grappling-hook D by the bolt $d$, which passes through the slot $e$ in said hook, which allows it to adjust itself to any inequalities of the load. The ends of the hook D are bent so as to form claws $d'$ $d^2$, and are twisted in opposite directions at more or less of an angle to the hook proper, and the claws of the hook project in the direction of the threads of the screw or the bar C, so that as the grapple is tightened it will tend to cause a firmer grip of the claws.

E is a nut, screw-threaded to fit the rod C, and its exterior is of any convenient form to fit the lever F. The lower face, $e'$, of this nut is semicircular in form, which rests in a corresponding orifice, $b'$, in the yoke B, and just above the face $e'$ is a washer, $e^2$, upon which the lever F rests.

The hook D being set into the object to be raised, the lever F is operated so as to cause the nut E to raise the rod C and hook D. It will thus be seen that the heaviest objects can thus be readily raised to a height corresponding to the capacity of the machine.

A brace, G, connects the legs of the yoke B, so as to prevent any spreading thereof in lifting very heavy weights. The lower portion, $g$, of the central opening of the yoke B is conical in form, which allows the rod C to adjust itself when the standards are set upon uneven ground.

By reference to the drawings it will be seen that the form of the hook D is such as will enable it to grasp a single rail or a wide beam, as may be desired.

Having thus fully described my invention, what I claim as new, and desire to secure by Letters Patent of the United States, is—

1. The standards A A', adjustable yoke B, having brace, and central orifice $b'$ $g$, in combination with the nut E, rod C, and lever F, substantially as set forth.

2. The standards A A', adjustable yoke B, having opening $b'$ $g$, in combination with the nut E, rod C, lever F, and rigid grappling D, substantially as set forth.

3. The standards A A', adjustable yoke B, in combination with the nut E, lever F, rod C, and hook D, having slot $e$, substantially as set forth.

4. The standards A A' and adjustable yoke B, in combination with the nut E, lever F, rod C, and hook D, having the opposite-projecting claws, $d'$ $d^2$, as set forth.

In testimony whereof I affix my signature in presence of two witnesses, this 3d day of November, 1882.

HENRY A. WEBBER.

Witnesses:
H. J. ENNIS,
E. H. BRADFORD.